(12) United States Patent
Roberts et al.

(10) Patent No.: US 11,968,104 B2
(45) Date of Patent: **\*Apr. 23, 2024**

(54) AUTOMATED MANIPULATION AND MONITORING OF EMBEDDABLE BROWSERS

(71) Applicant: PayPal, Inc., San Jose, CA (US)

(72) Inventors: Caitlin Tierney Roberts, Los Angeles, CA (US); Tairan Zhang, Los Angeles, CA (US); Robert Andrew Toledo, Los Angeles, CA (US); Aaron Craig, Los Angeles, CA (US); Taylor James Harwood, Pasadena, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,507

(22) Filed: Jan. 27, 2023

(65) Prior Publication Data
US 2023/0208732 A1  Jun. 29, 2023

Related U.S. Application Data

(63) Continuation of application No. 17/234,549, filed on Apr. 19, 2021, now Pat. No. 11,570,071.

(51) Int. Cl.
*H04L 12/00* (2006.01)
*G06F 3/04842* (2022.01)
(Continued)

(52) U.S. Cl.
CPC .......... *H04L 43/08* (2013.01); *G06F 3/04842* (2013.01); *G06F 9/451* (2018.02); *H04L 41/22* (2013.01); *H04L 67/02* (2013.01)

(58) Field of Classification Search
CPC .. G06F 9/451; G06F 3/04842; G06F 11/3055; H04L 67/02; H04L 41/22;
(Continued)

(56) References Cited

U.S. PATENT DOCUMENTS 6,133,919 A    10/2000 Bormann
7,231,458 B2   6/2007 Tenereillo
(Continued)

FOREIGN PATENT DOCUMENTS

CN    103095519 A  *  5/2013  ............. H04L 12/00
WO    WO0243334 A1 *  5/2022  ............ H04M 15/58

*Primary Examiner* — Frantz Coby
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to monitoring network traffic of an embeddable browser displayed by an application executing on a mobile computing device. In some embodiments, a first layer of the application manipulates one or more user interface elements displayed in the embeddable browser. The first layer of the application then detects network requests made by one or more application programming interfaces (APIs) executed by the embeddable browser in response to the manipulating. In some embodiments, the first layer sends to a second layer of the application results of observing network requests. In some embodiments, the second layer of the application displays, in real-time, information corresponding to the results of observing network requests. The disclosed techniques for monitoring activity on an embeddable browser included in mobile applications despite mobile security restrictions may advantageously reduce or remove wait times associated with manipulating and observing content of the embeddable browser.

20 Claims, 9 Drawing Sheets

(51) Int. Cl.
*G06F 9/451* (2018.01)
*H04L 41/22* (2022.01)
*H04L 43/08* (2022.01)
*H04L 67/02* (2022.01)

(58) Field of Classification Search
CPC ....... H04L 43/08; H04L 67/133; H04L 67/75; G06Q 30/0207; G06Q 30/0641; G06Q 30/0241; G06Q 50/01
USPC ......................................................... 709/224
See application file for complete search history.

(56) References Cited

U.S. PATENT DOCUMENTS

| | | | |
|---|---|---|---|
| 8,112,471 B2 | 2/2012 | Wei | |
| 8,868,722 B2 | 10/2014 | Giese | |
| 10,679,233 B2 | 6/2020 | Hudson et al. | |
| 2003/0010539 A1 | 1/2003 | Wang | |
| 2003/0226102 A1 | 12/2003 | Allor | |
| 2014/0025812 A1 | 1/2014 | Schwarzbauer | |
| 2016/0217484 A9 | 7/2016 | Hudson et al. | |
| 2019/0327363 A1* | 10/2019 | Raleigh | H04M 15/83 |
| 2022/0107817 A1 | 4/2022 | Bakshi | |

* cited by examiner

Method 600

Monitor network traffic of an embeddable browser displayed by an application executing on a mobile computing device.
610

Manipulate, by a first layer of the application executing on the mobile computing device, one or more user interface elements displayed in the embeddable browser.
620

Detect, by the first layer of the application, network requests made by one or more application programming interfaces (APIs) executed by the embeddable browser in response to the manipulating.
630

Send, by the first layer to a second layer of the application, results of observing network requests.
640

Display, by the second layer of the application in real-time, information corresponding to the results of observing network requests.
650

Fig. 6

AUTOMATED MANIPULATION AND MONITORING OF EMBEDDABLE BROWSERS

RELATED APPLICATION

The present application is a continuation of U.S. application Ser. No. 17/234,549, entitled "Automated Manipulation and Monitoring of Embeddable Browsers," filed Apr. 19, 2021, the disclosure of which is incorporated by reference herein in its entirety.

BACKGROUND

Technical Field

This disclosure relates generally to transaction processing, and, more specifically, to techniques for automatic manipulation of an embeddable browser, e.g., to inject electronic codes for transactions facilitated via mobile applications.

Description of the Related Art

User interfaces displayed by web browsers may include portions depicting content of external websites via an embeddable browser (which may also be referred to as a WebView). For example, a social media website may include an embeddable browser on one of its webpages depicting content from a merchant's website in order to advertise goods and services of this merchant to various users of the social media website. Similarly, this same social media website may have a version of their website (which is generally available for desktop browser) that is executable on mobile devices (via a mobile application). The mobile application of the social media website may also include an embeddable browser depicting content from an external website.

BRIEF DESCRIPTION OF THE DRAWINGS

FIG. 6 is a flow diagram illustrating a method for monitoring network traffic of an embeddable browser, according to some embodiments.

DETAILED DESCRIPTION

Figure 1:
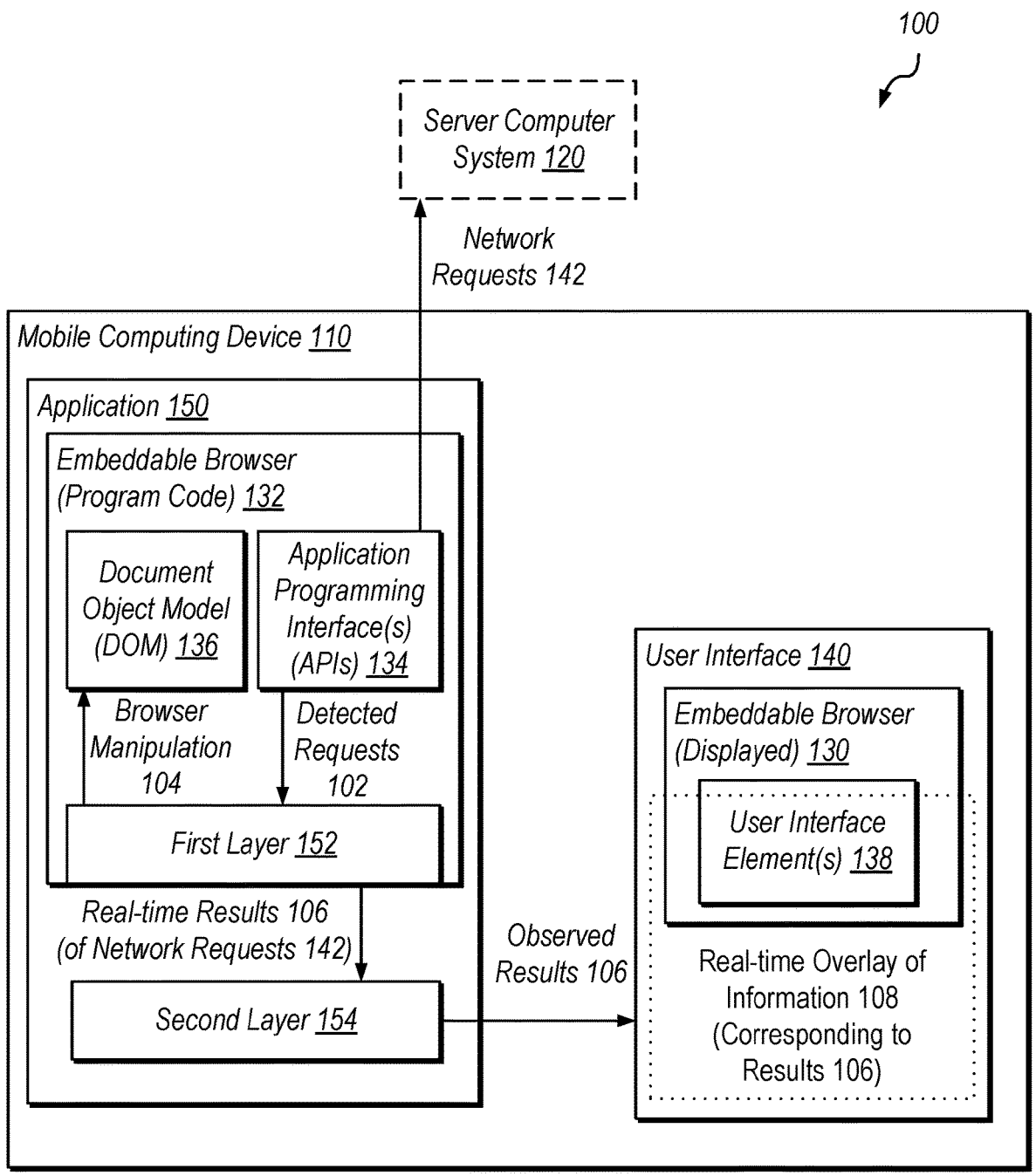
FIG. 1 is a block diagram illustrating an example system including a mobile computing device configured to execute an application that monitors network activity of an embeddable browser, according to some embodiments.

It is common for users to manually enter certain information into input fields of a user interface to complete various processes online. For example, a user may be required to manually enter electronic codes in order to apply these codes for a transaction prior to processing of the transaction. For example, whether viewing a merchant's website within a web browser via a desktop computer or viewing the merchant's website via a mobile application of the merchant on a mobile device, a user is required to manually copy a coupon code for this merchant (e.g., obtained from another website, an email from this merchant, a pop-up advertisement, etc.) and paste the coupon code into an input field displayed to the user via the merchant's website such as a promotional code input field displayed in a checkout/cart webpage. As another example, a user may be required to manually enter information into a web form, e.g., such as an online application for a credit card. In this example, the user must either remember or look up the necessary information, enter the information, and then check whether the information they entered is correct (e.g., does not include any typos).

One technique for removing the burden from users of manually entering information into a user interface, such as a website, includes locating the appropriate information, automatically entering the information in the proper location on the interface, and then monitoring the user interface (e.g., a user's cart or a checkout webpage) to determine, after the information is entered, when the information is finished being processed by the user interface and whether the processing was successful. For example, the disclosed system may determine when an electronic code is finished applying for a transaction as well as whether the code was successful (e.g., whether the code is still active for a merchant associated with the transaction). In some situations, the monitoring may be performed based on changes to the user interface (e.g., changes to the total payment amount, additional text elements being displayed, etc.). In other situations, the monitoring may be performed based on a hardcoded wait time (e.g., wait ten seconds after a code is applied before applying additional codes). Implementation of such techniques, however, is often error prone (e.g., a given code may take twelve seconds to finish applying).

Monitoring network activity of an embeddable browser executed within a mobile application is difficult due to heavier security restrictions for mobile applications in general e.g., relative to web browsers. In some situations, mobile applications that include embeddable browsers may facilitate transactions. As more and more transactions are conducted electronically, for example, a plethora of electronic codes (e.g., discount, promotional, coupon, etc.) are made available to online users. Users may locate various electronic codes and then manually apply these codes for a given electronic transaction to observe whether they are successful. Even after they have discovered one or more electronic codes that may apply to their electronic transaction, these users must manually enter the discovered codes one at a time. In some cases, manual input of electronic codes introduces error, e.g., when a user applies a first code and then quickly applies a second code without waiting for the first code to successfully apply (this in turn may cause the user to miss out on benefits provided by the first code). Similar to the discovery process, manual application of electronic codes is tedious. Without the ability to monitor the network activity of an embeddable browser, automatic manipulation of information within the embeddable browser may be rendered useless.

The disclosed techniques provide for automatic injection of information into an embeddable browser executed by a mobile application and then monitoring actions taken by the embeddable browser in response to the injection. As one specific example, the disclosed system may inject one of a plurality of electronic codes into an embeddable browser for a transaction initiated by a user within a mobile application. In this specific example, in order to efficiently and accurately apply a set of codes on a website displayed within the embeddable browser, the disclosed mobile application needs to be able to detect when a code is being applied on the website, when the code has finished applying, and finally whether the code was successful. The disclosed techniques allow for injection of information sequentially, which may advantageously prevent or reduce occurrences of "overlapping," in which a first set of data is hastily injected before previously injected data is finished processing. As one specific example, a first applied code will have time to process before the disclosed system automatically injects a second code for an electronic transaction. In this specific example, overlapping of code injection may lead to inaccurate results and a loss of potential benefits from the codes.

The mobile device solution involves using network monitoring techniques to observe the effect of injected information. Due to privacy limitations for mobile applications (e.g., ANDROID and/or IOS applications), the disclosed techniques are restricted from directly monitor activity of an embeddable browser within a mobile application (e.g., information cached during a browser session) as is possible within browser extensions. That is, application programming interfaces (APIs) built into many web browsers that are capable of monitoring a user's activity directly during a given browser session are not available on the mobile application side. As such, the disclosed techniques implement a mobile application capable of monitoring network requests made by APIs executed by an embeddable browser within the mobile application executing on a mobile computing device. The disclosed network monitoring techniques advantageously allow systems to observe activity of mobile applications that was previously restricted due to the security limitations of mobile operating systems.

As one specific advantage, the disclosed techniques may provide users with an automated solution for applying relevant codes for any of various transactions the users would like to initiate with various different entities (e.g., merchants). More generally, the disclosed techniques may speed up various online processes, by providing for automatic manipulation of a user interface facilitating such online processes. For example, the disclosed automation process may reduce the time needed for users to obtain benefits from various codes applied to a given electronic transaction, which in turn may improve user experience. Further, the disclosed messaging techniques may reduce or remove errors associated with hard-coded timers and other such techniques used to monitor automated application of codes at merchant user interfaces. Said another way, the disclosed techniques may reduce or prevent the occurrence of code "overlapping." Generally, the disclosed techniques may advantageously allow for greater visibility when it comes to the effect of manipulating a user interface displayed within an embeddable browser of a mobile application.

Example Mobile Application

FIG. 1 is a block diagram illustrating an example system 100 including a mobile computing device 110 configured to execute an application that monitors network activity of an embeddable browser. In the illustrated embodiment, system 100 includes mobile computing device 110, which in turn includes application 150 and user interface 140. In some embodiments, system 100 includes a server computer system 120 configured to communicate with mobile computing device 110.

Mobile computing device 110, in the illustrated embodiment, executes an application 150 that manipulates embeddable browser 132 and then observes the results 106 of the manipulating in real time. Application 150 includes a first layer 152 and a second layer 154 that communicate to manipulate and observe program code 132 of the embeddable browser. A first layer 152 of application 150 performs browser manipulation 104 by injecting information into the document object model (DOM) 136 of the embeddable browser 132. In the illustrated embodiment, the first layer 152 of application 150 detects, real time with the manipulating, network requests submitted by APIs 134 included in the program code 132 of the embeddable browser in response to the manipulation 104. The first layer 152 of application 150 then sends results 106 of the detected requests 102 to the second layer 154 of application 150.

The first layer 152 of application 150 may be a JavaScript file that is injected into the DOM 136 of embeddable browser 132. The first layer 152 may be referred to herein as the WebView JavaScript client. For example, first layer 152 may be a logic layer of application 150 that is included in embeddable browser 132 and relays information to the second layer 154. As one specific example, first layer 152 performs business logic for application 150. In contrast, the second layer 154 of application 150 may be a native layer or presentation layer of the application. That is, second layer 154 may be a user interface or presentation layer of application 150 executable to display user interfaces of the application according to the native platform of the mobile computing device 110 (e.g., iOS, ANDROID, etc.). As one specific example, second layer 154 may be executable to display a "home" webpage of application 150 that includes a search field for users to request content of various merchants to be displayed via an embeddable browser within user interface 140. The second layer 154 of the application may be referred to herein as the native layer of the application.

Application 150 causes user interface 140 to display content from an external source via a displayed embeddable browser 130 by executing the program code 132 of the embeddable browser. Further, in the illustrated embodiment, the second layer 154 of application 150 causes display of information 108 corresponding to observed results 106 via the user interface 140 of mobile computing device 110. For example, in addition to causing user interface 140 to render a display of embeddable browser 130 including one or more user interface elements 138, application 150 causes user interface 140 to overlay in real-time the observed results 106 from the manipulation of DOM 136 of the embeddable browser. One specific example of display of information 108 is discussed in detail below with reference to FIG. 5B. The one or more user interface elements 138 may include an input element that is intended to receive user input. In some embodiments, the automatic manipulation of program code 132 includes inputting information into the input element, without receiving input from a user.

As discussed above, program code 132 of the embeddable browser executes one or more APIs in response to browser manipulation 104. In some embodiments, the executed one or more APIs send network requests 142 to server computer system 120. For example, if the first layer 152 automatically applies an electronic code to a transaction by injecting the code into DOM 136, then the one or more APIs 134 will send network requests to a server of the embeddable browser 132 to determine whether the injected code is valid and can be applied to a current transaction. In some embodiments, server computer system 120 sends responses to the network requests 142 back to mobile computing device 110. These responses may indicate whether the injected code is valid and whether this code may be successfully applied to a transaction. As discussed in further detail below with reference to FIG. 2, first layer 152 detects responses from server computer system 120 as well as network requests 142.

In some embodiments, server computer system 120 may be a server of a merchant whose website is displayed by embeddable browser 130 within user interface 140. For example, server computer system 120 may be a merchant server configured to provide and track the user of various electronic codes that can be applied to different transactions during different periods of time. As one specific example, server computer system 120 may be a server of a shoe merchant and this server may be configured to keep track of different coupon codes that can be used for transactions with this merchant (e.g., 20% off transactions of $100 or more with the shoe merchant that are initiated in the month of March). In various embodiments, application 150 submits codes within embeddable browser 130 and server computer system 120 validates these codes.

As used herein, the term "real-time" refers to the response time of a system to a system event that has occurred. For example, the display of information corresponding to the results of observing network requests occurs within a specific window of time such that the delay between the network requests being made and a user being able to see the results is negligible. The response time of the disclosed system to a system event is bound to the time it takes an embeddable browser to send a request to its server to validate an injected code. Generally speaking, this response time is milliseconds (e.g., 50-100 ms). In various situations, however, the response time of the disclosed system in observing results of manipulating an embeddable browser vary depending on the speed of the device (e.g., a user's mobile phone) on which the embeddable browser is being executed as well as current response times of the systems associated with this embeddable browser (e.g., the browser's server). For example, display of results of observing network requests from an embeddable browser in real-time means that network requests are observed while interface elements, displayed in the embeddable browser, are being manipulated. As one specific example, results of a set of codes that are injected into a code input field displayed in the embeddable browser (e.g., whether the code was successful, how much of a discount the code provided, etc.) are displayed and updated as results for each of the codes are received. That is, results for a first code that was already injected may be displayed while a second code is being injected.

As used herein, the term "network activity" broadly refers to any activity occurring on a network, including any type of transaction, request, response, or the like. "Network activity" of an embeddable browser refers to any request that is external to the processor executing the embeddable browser, particularly one that is destined for a wide-area network such as the Internet. For example, a network request originating from an embeddable browser may be a hypertext transfer protocol (HTTP) request from a merchant website to a server of the merchant. As another example, an embeddable browser may send a network request that includes an injected code to a server associated with the embeddable browser e.g., server computer system 120.

In some embodiments, the first layer 152 determines, based on information displayed by the one or more user interface elements 138, various aspects of a transaction being conducted via mobile computing device 110. For example, first layer 152 may determine a merchant, a transaction amount, one or more items involve in the transaction, a code input field, etc. Once these aspects are identified, first layer 152 proceeds to manipulate the DOM 136 of the embeddable browser. As one particular example, first layer 152 may detect that a user has added an item to their cart. As another particular example, first layer 152 may detect that displayed embeddable browser 130 is showing a checkout page to a user participating in a transaction. In order to determine what information is being displayed at user interface 140, first layer 152 may query the DOM 136 of the embeddable browser, thereby obtaining metadata for the embeddable browser. For example, by querying the DOM 136 of the embeddable browser, first layer 152 is able to see which user interface elements are being rendered within the display of the embeddable browser 130.

Figure 2:
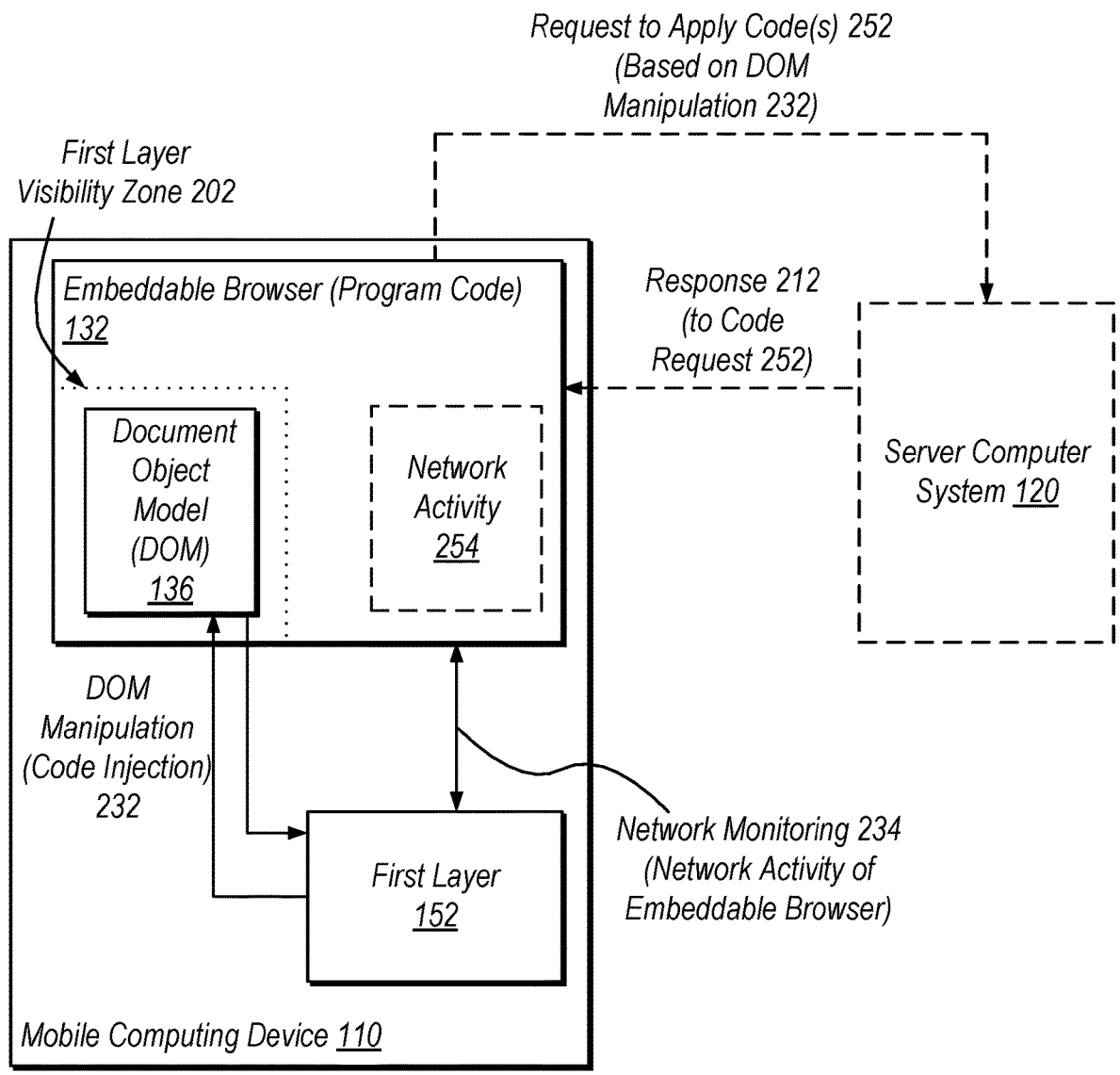
FIG. 2 is a block diagram illustrating example network monitoring, according to some embodiments.

FIG. 2 is a block diagram illustrating example network monitoring. In the illustrated embodiment, system 200 includes mobile computing device 110. In some embodiments, system 200 includes server computer system 120. Server computer system 120 may be a web server for a website shown within the displayed embeddable browser 130 discussed above with reference to FIG. 1.

Within the program code 132 of the embeddable browser, there is a visibility zone 202 that includes the DOM 136 and any other information that the first layer 152 of application 150 is able to see. For example, the first layer 152 is able to perform DOM manipulation 232 by injecting a code into the DOM 136 of the embeddable browser 130. The first layer 152, however, does not have visibility within the program code 132 of the embeddable browser outside of this zone 202 and, therefore, cannot automatically see network activity 254 of the embeddable browser. The disclosed techniques provide for a particular method of monitoring such network activity 254.

In the illustrated embodiment, first layer 152 performs network monitoring 234 to detect actions taken by embeddable browser 132 outside of visibility zone 202. For example, when embeddable browser 132 sends a request 252 to apply one or more electronic codes to server computer system 120 based on DOM manipulation 232, this request 252 will be picked up by the network monitoring 234 performed by the first layer 152. Similarly, responses from server computer system 120, such as response 212 to the code request 252 is also detected by first layer 152. In various situations, the program code 132 of the embeddable browser may execute various commands to communicate with various other computer systems or devices.

In some embodiments, first layer 152 of application 150 is a JavaScript client layer injected into the program code of the embeddable browser. For example, based on the native mobile device platform (e.g., iOS or ANDROID), the disclosed techniques include injection of the client layer into the embeddable browser. In the context of the iOS platform, the WKUserScript API module is implemented to perform the injection of the first layer 152. In the context of the ANDROID platform, the Web View.evaluateJavascript API module is implemented to perform the injection for the first layer 152. The JavaScript client layer implements a proxy API to monitor execution of JavaScript modules by the embeddable browser 132. For example, when embeddable browser 132 executes the window.XMLHttpRequest.prototype.send module in order to send requests (e.g., request 252) to server computer system 120, the JavaScript client layer injected into embeddable browser 132 "traps" this function call to the http request low-level JavaScript module. As another example, when embeddable browser 132 executes the window.fetch module, the JavaScript client layer injected into the embeddable browser "traps" this function call to the fetch low-level JavaScript module.

In some embodiments, due to its ability to observe the DOM 136 of embeddable browser 132, first layer 152 monitors information displayed by the embeddable browser in order to determine results of DOM manipulation 232. For example, first layer 152 may observe the DOM 136 to determine whether an applied code is successful, e.g., based on visual changes (updates in a transaction amount, new text elements, etc.) to a webpage displayed by embeddable browser 130. As one specific example, first layer 152 may scrape data from the webpage (e.g., from DOM 136) to determine when a code has begun applying, when the code is finished applying, whether the code was successful, etc. Scraping the DOM 136 allows first layer 152 to collect user-facing indicators displayed to a user of mobile computing device 110. In such embodiments, first layer 152 operates on a hardcoded time (e.g., wait ten second between applying each code). Such techniques, however, are error prone and often slow due to the hardcoded wait times. As a result, such hardcoded techniques are only implemented as a backup measure e.g., if the network monitoring techniques discussed above fail.

Figure 3:
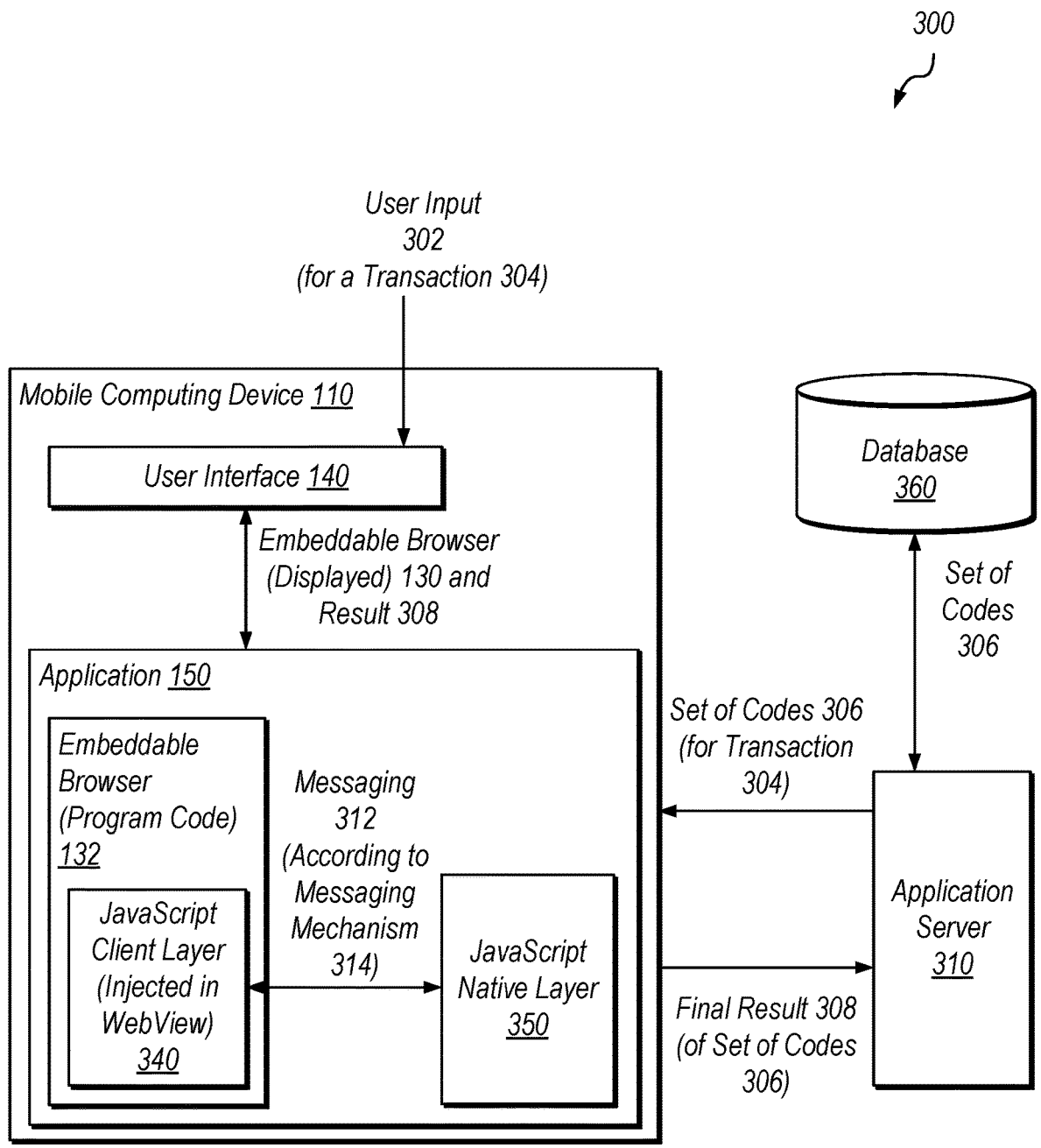
FIG. 3 is a block diagram is shown illustrating example messaging between layers of an application during automatic injection of a set of codes, according to some embodiments.

Turning now to FIG. 3, a block diagram is shown illustrating example messaging 312 between layers of application 150 during automatic injection of a set of codes 306. In the illustrated embodiment, system 300 is shown including a mobile computing device 110, an application server 310, and a database 360. Further, in the illustrated embodiment, application 150 includes a JavaScript native layer 350 and program code 132 of an embeddable browser with an injected JavaScript client layer 340. JavaScript client layer 340 is one example of the first application layer 152, while JavaScript native layer 350 is one example of the second application layer 154 discussed above with reference to FIGS. 1 and 2. For example, JavaScript native layer 350 displays a drawer user interface that shows a user the progress the application 150 has made in applying set of codes 306 (e.g., as shown in FIG. 5B).

Application 150, in the illustrated embodiment, causes user interface 140 to display content (e.g., a merchant's website) by executing the DOM included in the program code 132 of the embeddable browser. User interface 140, in the illustrated embodiment, receives user input 302 for an electronic transaction 304 displayed within user interface 140. For example, user input 302 may be a request to purchase an item or a request to view a transaction summary page (e.g., a checkout page). As another example, user input 302 may be selection of a particular user interface element as discussed in further detail below with reference to FIG. 4.

In response to the user input 302, JavaScript client layer 340 begins messaging 312 with JavaScript native layer 350 for the transaction 304 according to a particular messaging mechanism. For example, the client layer 340 may communicate that a user of mobile computing device 110 wishes to automatically apply codes to a transaction 304 associated with a particular merchant. Client layer 340 may ask the native layer 350 for codes to apply to the transaction. JavaScript native layer 350 causes mobile computing device 110 to request a set of codes 306 for transaction 304 from application server 310.

Once native layer 350 receives the set of codes 306, it sends the codes to client layer 340 via messaging 312 for automatic injection into the DOM included in the program code 132 of the embeddable browser for transaction 304. Once the client layer 340 is finished applying the set of codes 306 it provides the final results 308 of injecting the codes to the native layer 350, which in turn provides results 308 to application server 310. In addition to providing the final results 308 to application server 310 for long term storage, native layer 350 causes display of results of injecting the set of codes 306 in real-time at user interface 140 such that the user providing input 302 is able to see the results as they occur overlayed on a display of the embeddable browser within user interface 140.

Application server 310, in the illustrated embodiment, retrieves set of codes 306 from database 360 based on information received from native layer 350 for the transaction 304. For example, based on transaction 304 being initiated with a particular merchant (e.g., a merchant whose website is displayed via the displayed embeddable browser 130 within user interface 140), application server 310 retrieves one or more codes from database 360 and provides them to native layer 350. In addition, application server 310 stores the final result 308 received from native layer 350 in order to more intelligently provide sets of codes for various future transactions with the particular merchant. For example, once application 150 is finished applying set of codes 306 for transaction 304, the application sends a summary of the success or failure of one or more codes within the set of codes 306. As one specific example, application server 310 may receive final result 308 specifying that a first code (e.g., a coupon) was successful and that it saved the user of the mobile computing device five dollars at a particular merchant, that a second code was also successful but only saved the user two dollars, and that a third code was unsuccessful. Based on this information, application server 310 may provide the successful codes (particularly the first code) to future users attempting to initiate transactions with the particular merchant.

In some embodiments, application server 310 is configured to communicate with application 150. This application server may store data for application 150 such as codes applicable to merchants' whose websites are displayed within embeddable browser 130, data indicating which codes are successful previously and which codes are currently successful, updates for the application, etc. As one specific example, application server 310 may be a PAYPAL server. In this specific example, the PAYPAL server is configured to communicate with a PAYPAL application (e.g., application 150) to process transactions between various different entities.

The messaging 312 shown in FIG. 3 is performed using a messaging mechanism 314, such that different layers of application 150 can easily communicate with one another. For example, client layer 340 leverages the native post message module to facilitate communication back to the native layer 350. In the context of the iOS platform, communication between the native layer and the client layer of application 150 is performed by executing a web kit post message function. In the context of the ANDROID platform, communication between the native layer and the client layer of application 150 is performed by executing an ANDROID post message function. Such techniques allow the client layer 340 to inform the native layer 350 of updates occurring within the WebView. For example, the client layer 340 may send constant updates to the native layer 350 as it applies each code included in set of codes 306. In this way, native layer 350 is aware of a current code being applied as well as which code currently performed the best out of the codes that have already been applied.

In some embodiments, messages sent from the client layer 340 to the native layer 350 using the messaging mechanism discussed above include updates regarding the injection of the set of codes. For example, a given message sent to native layer 350 may specify that a code is finished applying, that a code is currently being processed, that the injection of the set of codes 306 is complete, whether a code was successful, that the injection of the set of codes 306 was interrupted (e.g., that user providing input 302 requested to stop application of the set of codes 306), etc.

Example Automatic Code Injection

Figure 4:
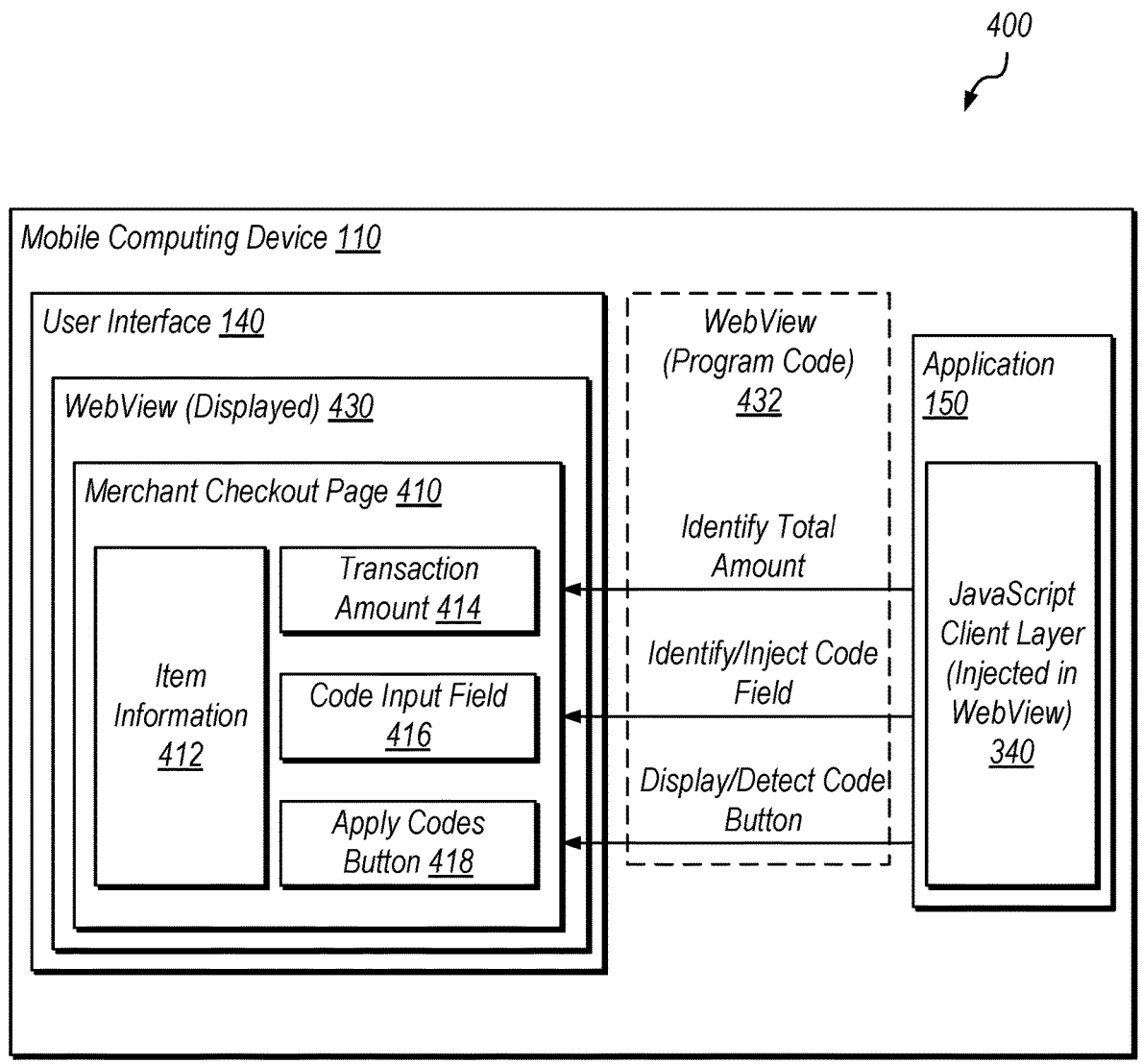
FIG. 4 is a block diagram illustrating example manipulation of an embeddable browser, according to some embodiments.

FIG. 4 is a block diagram illustrating example manipulation of an embeddable browser. In the illustrated embodiment, client layer 340 of application 150 is executable to automatically apply codes within a merchant checkout page 410 displayed via the user interface 140 of mobile computing device 110 for an electronic transaction.

In the illustrated embodiment, system 400 includes mobile computing device 110 which displays several components within user interface 140 and also include various non-displayed components (e.g., program code). The components displayed within user interface 140 include a displayed 430 WebView (one example of displayed embeddable browser 130), a merchant checkout page 410 included in the displayed 430 WebView and various user interface elements 412-418 shown within page 410. The non-displayed components include application 150, which in turn includes JavaScript client layer 340 and the program code 432 of the WebView.

Merchant checkout page 410 displays item information 412, a transaction amount 414, a code input field 416, and an apply codes button 418. Item information 412, in the illustrated embodiment, displays details for the electronic transaction to a user of mobile computing device 110 (e.g., descriptions of items selected for potential purchase, individual amounts associated with the items, etc.). In the illustrated embodiment, JavaScript client layer 340 automatically applies a set of codes based on first identifying the total transaction amount 414, the code input field 416, and the apply codes button 418 displayed within the merchant checkout page 410. The client layer 340 identifies this information by looking at the program code 432 of the WebView.

For example, client layer 340 first detects that a user is viewing the merchant checkout page 410 by querying the DOM (included in the program code 432 of the WebView). Then, client layer 340 causes display of a prompt to the user via merchant checkout page 410 (by manipulating the DOM) e.g., in the form of an "Apply Codes" button 418. When client layer 340 detects that a user has clicked on the apply codes button 418, this layer injects a first code of a set of codes received from the native layer 350 into code input field 416 by manipulating the DOM of the merchant checkout page 410 included in the program code 432 of the WebView. The client layer 340 then applies the first code by injecting a script tag with Stringfield JS to select (e.g., click on) a button that says "apply code" within the merchant checkout page 410. Client layer 340 then determines whether the first code was successful by monitoring network activity of the merchant checkout page 410 using the network monitoring techniques discussed above with reference to FIG. 2.

For example, client layer 340 waits for the code to finish applying by observing when the merchant checkout page 410 proxies "fetch" and/or "XMLHttpRequest" JavaScript APIs. In this way, client layer 340 is able to observe when the checkout page makes network requests related to the first code being applied and, thus, is able to guarantee that each code is applied successfully before an additional code is applied (to make sure that no code application process is interrupted). Once the first code has finished applying, client layer 340

Once the first code has finished applying, client layer 340 observes whether the code is successful. If the code is successful, client layer 340 determines the updated transaction amount displayed within merchant checkout page 410 and determines the difference between the original identified transaction amount 414 and the updated amount. Client layer 340 then sends the updated total price and the successful first code to native layer 350 for storage by application server 310 for future electronic transactions. In addition, based on instructions received from native layer 350, client layer 340 causes overlay on the merchant checkout page 410, real time with applying the codes, of the progress of applying the set of codes (e.g., which codes have been applied and which codes are successful). Client layer 340 repeats this process for each code in the set of codes 306 for a given electronic transaction.

Once client layer 340 is finished applying the codes included in the set of codes and sends the results to native layer 350, the native layer determines which code out of all of the applied codes performed the best (e.g., saved the user the most). For example, native layer 350 scrapes the DOM of merchant checkout page 410 after each code has successfully applied to determine the updated transaction amount. Native layer 350 then subtracts this value from the original transaction amount determined prior to applying coupons to determine the amount saved. Based on this determination, native layer 350 instructs client layer 340 to display a summary message of the results overlayed on merchant checkout page 410. In addition, client layer 340 injects the best performing code (determined by native layer 350) into code input field 416 such that this code is the final code applied to the electronic transaction initiated at mobile computing device 110.

Note that various examples herein specify manipulating an embeddable browser for an electronic transaction, but these examples are discussed for purposes of explanation and are not intended to limit the scope of the present disclosure. In other embodiments, any of various types of content displayed within embeddable browsers may be manipulated. For example, manipulation of an embeddable browser may include injection of various types of information into the embeddable browser and is not necessarily limited to the injection of codes for electronic transactions. As one specific example, shipping and payment information fields may be automatically filled using the disclosed manipulation techniques. More generally, any of various types of input fields (e.g., during a transaction checkout process) may be automatically filled using the disclosed manipulation techniques. Such implementation may advantageously improve e.g., a user's checkout experience.

Example User Interfaces

Figure 5A:
FIGS. 5A-5C are diagrams illustrating example user interfaces of an application executing on a mobile computing device, according to some embodiments.
Figure 5B:
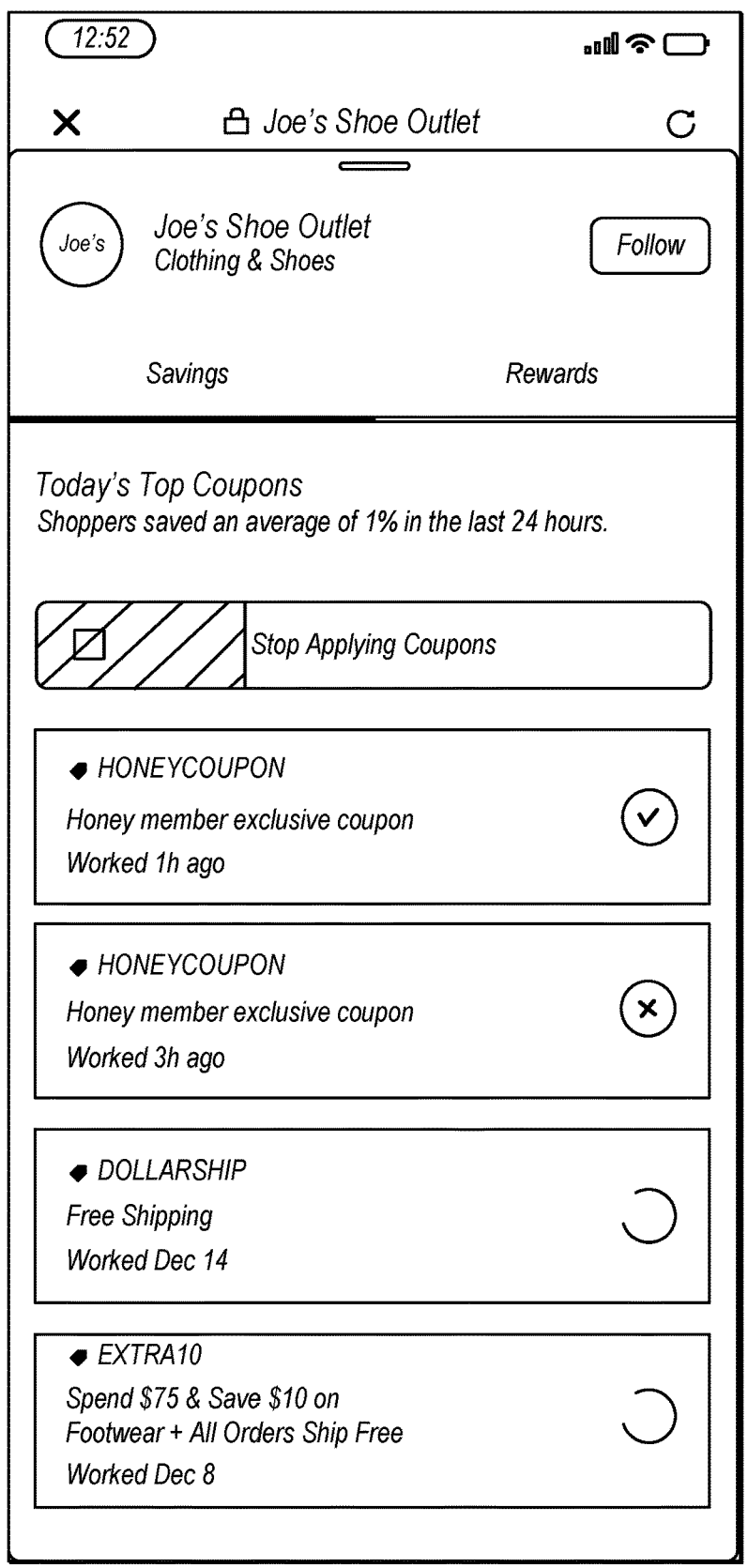
Figure 5C:
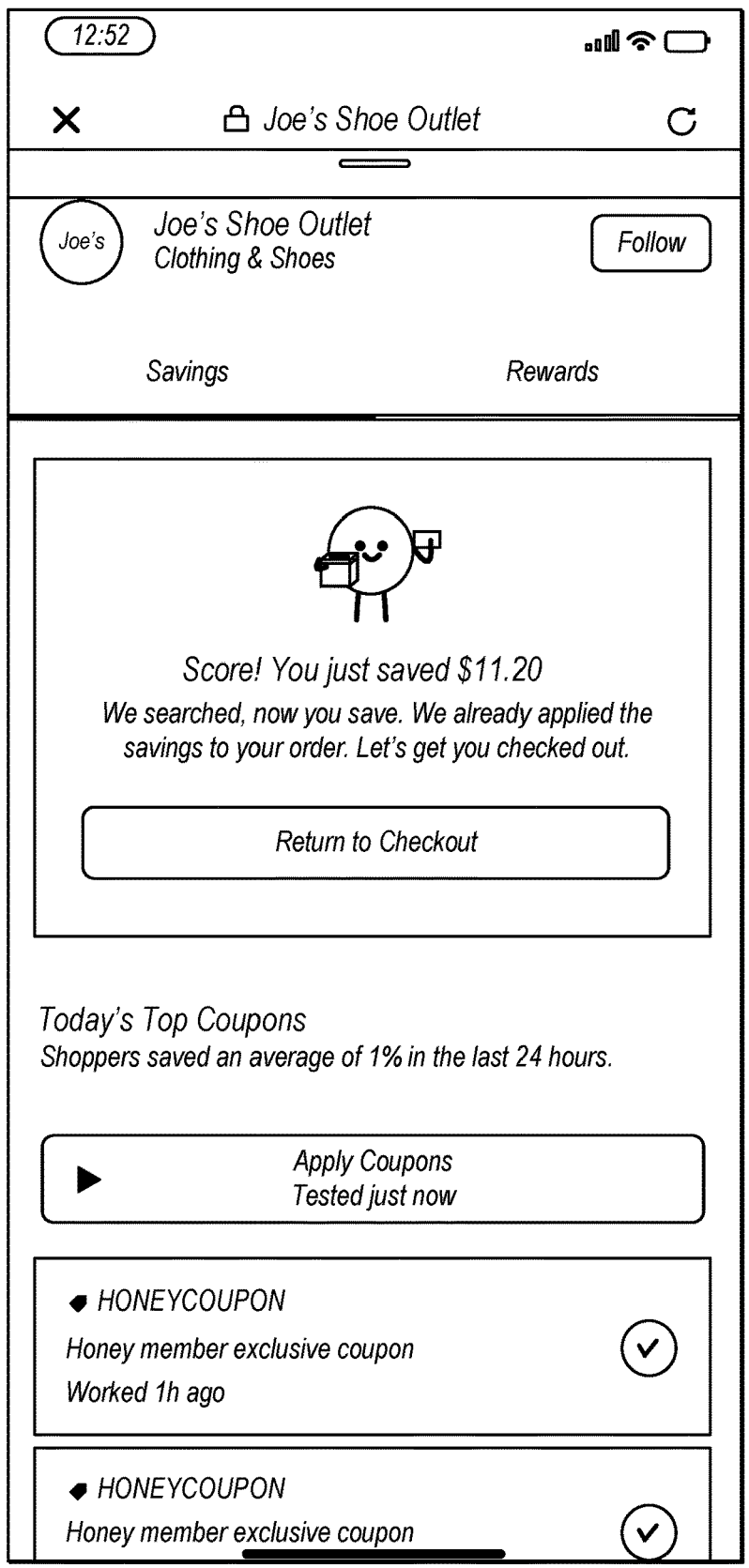

FIGS. 5A-5C are diagrams illustrating example user interfaces of an application executing on a mobile computing device. Display of a user interface 502 shown in FIG. 5A is caused by application 150 executing the program code 132 of an embeddable browser in order to display content from an external website, such as the shopping cart of a user shopping at Joe's Shoe Outlet on their mobile device via a mobile application. Second layer 154 of application 150 causes display of the user interface 504 shown in FIG. 5B and the user interface 506 shown in FIG. 5C over the display of the embeddable browser 130 within a user interface of mobile computing device 110.

In FIG. 5A, user interface 502 displays, within an embeddable browser executed by a mobile application that automatically applies coupons, a shopping cart webpage of a merchant, Joe's Shoe Outlet. Within user interface 502, a user has the option to select the X at the top left corner of the screen to close the embeddable browser displaying the merchant's webpage as an overlay on top of the home page of the mobile application. This action causes the user to be returned to the home page of the mobile application. As one specific example, the mobile application may be the HONEY mobile application. Additionally, user interface 502 shows an "Apply Coupons" button that is selectable by a user to initiate automatic application of a set of coupon codes for a transaction. For example, if the user selects the apply coupons button, the mobile application will proceed to apply various promo codes for the transaction involving the two pairs of shoes to be purchased from Joe's Shoe Outlet.

In FIG. 5B, a user interface 504 displays a drawer of coupons that have either already been applied by application 150, are in the process of being applied, or have yet to be applied. In addition, user interface 504 shows which coupons were successful using a check mark at a right portion of the coupon and which coupons were unsuccessful using an x mark at the right portion of the coupon. Interface 504 further displays the source of applied coupons (e.g., a HONEY member exclusive coupon). The "Stop Applying Coupons" button displayed by interface 504 allows a user of mobile computing device 110 to cut off the injection of a set of coupons while the injection is in progress. In response to a user selecting this button, the mobile application causes display of a confirmation message saying, "Are you sure you want to stop applying coupons?" to allow the user to confirm their selection. A user may select this button, for example, if they decide they do not want to wait for the automated coupon process to complete. As another example, a user may see that a first applied coupon is successful and they may wish to proceed with this coupon rather than other coupons that have not yet been applied.

In FIG. 5C, a user interface 506 displays the results of applying a set of coupon codes. For example, user interface 506 shows that a user saved $11.20 for the transaction for the two pairs of shoes shown in user interface 502. Interface 506 allows the user to select a button to "Return to Checkout." Once the user selects this button, they are returned to an updated version of user interface 502 showing an updated total of $118.78 after subtracting the amount saved (i.e., $11.20) from the original total (i.e., $129.98) for the transaction.

Although the disclosed techniques relate to monitoring network activity of embeddable browser within mobile applications, in other situations, similar techniques may be applied to network activity of web browsers with less rigid security restrictions. For example, although the user interfaces illustrated in FIGS. 5A-5C are rendered by a mobile computing device (e.g., device 110) by a mobile application, in some situations similar user interfaces may be rendered by a computing device (e.g., a desktop computer) on a web browser. One technique for reducing or removing the need for manual input of information includes monitoring network activity during a browser session, for example. As one specific example, the HONEY browser extension provides users with a program that automatically collects and applies various electronic codes for different appropriate transactions. Users are able to download and execute the HONEY software via a browser plugin within their desired web browser (e.g., SAFARI, FIREFOX, INTERNET EXPLORER, etc.). The browser plugin implements a web request application programming interface (API) provided by the user's current web browser to intercept network traffic of the web browser. The browser plugin includes a script for the merchant webpage, a script for the honey icon in the web browser toolbar (e.g., for accessing features of the HONEY software), and a script in the background page (a backend process running on the browser) that stores information about different merchants, executes network requests, and stores data cached between the user's browsing sessions. (The stored information may include information about the user's account e.g., with a given merchant, electronic codes used in the past for the given merchant, plugin logic, etc.). In the specific example of the HONEY mobile application, the disclosed techniques attempt to gain parity between implementation of the mobile application and the browser extension, by implementing different network monitoring techniques to observe the results of automatically applying codes within the mobile application.

Example Method

FIG. 6 is a flow diagram illustrating a method 600 for monitoring network traffic of an embeddable browser, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, mobile computing device 110 performs the elements of method 600. In some embodiments, mobile computing device 110 executes software including instructions to perform the elements of method 600.

At 610, in the illustrated embodiment, an application executing on a mobile computing device monitors network traffic of an embeddable browser displayed by the application. The embeddable browser may be a WebView showing a webpage of a merchant's web site, for example.

At 620, a first layer of an application executing on a mobile computing device manipulates one or more user interface elements displayed in an embeddable browser displayed by the application. In some embodiments, prior to manipulating the one or more user interface elements, the first layer of the application identifies particular content displayed within the embeddable browser. For example, the first layer may query the DOM of the embeddable browser to determine if it is displaying a user interface element meant to receive user input. In some embodiments, the first layer receives, from the second layer of the application, instructions for manipulating the embeddable browser, where the instructions are received based on the identified particular content. For example, the second layer of the application may instruct the first layer to inject one or more electronic codes into a code input field displayed in the embeddable browser. As another example, the second layer may instruct the first layer to insert user identification information (e.g., a username and password, a street address, billing information, etc.) into appropriate ones of multiple different input fields displayed in the embeddable browser.

In some embodiments, the manipulating includes injecting, by altering a document object model (DOM) of the embeddable browser, a set of codes into the one or more user interface elements, where the set of codes is selected for injection based on determining an entity associated with the one or more user interface elements displayed within the embeddable browser. For example, the first layer of the application may identify a merchant that a user of the mobile computing device is attempting to initiate a transaction with. In this example, based on this determination, the first layer asks the second layer of the application which codes to apply for the transaction.

In some embodiments, prior to the manipulating, the first layer of the application identifies display of an input element within the embeddable browser. In some embodiments, the second layer of the application displays, in response to the identifying, a user interface element that is selectable by a user of the mobile computing device to initiate the manipulating, where the user interface element is displayed over the display of the embeddable browser. For example, the second layer of the application may cause an "Apply Coupons" button to be displayed to the user over the display of the embeddable browser.

In some embodiments, the manipulating further includes applying, for a transaction that is not yet initiated, a first code of a set of codes in the embeddable browser. In some embodiments, the first layer of the application causes, via the embeddable browser based on monitoring network requests, display of a confirmation message indicating updated information for the transactions, where the updated information includes an updated transaction amount.

At 630, the first layer of the application detects network traffic of the embeddable browser in response to the manipulating, where the detecting includes monitoring execution of one or more application programming interfaces (APIs) by the embeddable browser. In some embodiments, the detecting is performed by the first layer using a JavaScript API. In some embodiments, the detecting further includes monitoring responses to the network requests received by the embeddable browser.

At 640, the first layer sends to a second layer of the application executing on the mobile computing device, results of observing network requests. In some embodiments, the first layer of the application is a client JavaScript file injected into the embeddable browser. In some embodiments, the second layer of the application is a native application layer that is executable to display the results in real-time. For example, the native layer includes program code (e.g., Swift for iOS and Kotlin for ANDROID) may be executable to display the drawer user interface 504 shown in FIG. 5B, while the client file injected into the embeddable browser may be a logical application layer.

At 650, the second layer of the application displays, in real-time, information corresponding to the results of observing the network requests. In some embodiments, the results of observing network requests, displayed by the second layer of the application in real-time, indicate one or more of the following: when a code begins applying, when a code is finished applying, and whether a code is successful. In some embodiments, the application further displays the embeddable browser overlayed with the results displayed by the second layer of the application via a user interface of the mobile computing device, where the displaying by the second layer includes displaying a link element that is selectable to terminate manipulation of the one or more user interface elements prior to the manipulating being complete.

In some embodiments, the first and second layers of the application executing on the mobile computing device communicate via a messaging mechanism. In some embodiments, the messaging mechanism facilitates one-way communication from the first layer to the second layer during the manipulating and the detecting. In some embodiments, the first layer of the application monitors information displayed within the embeddable browser in response to the detection of network requests discussed above with reference to FIG. 2 being unsuccessful. In some embodiments, the monitoring of displayed information includes scraping, a threshold amount of time after the manipulating, a document object model (DOM) of the embeddable browser to determine information displayed within the embeddable browser, where the information displayed within the embeddable browser indicates results of the manipulating. For example, the client layer 340 of application 150 may wait five seconds after manipulating the DOM of the embeddable browser before scraping the DOM to determine if an updated price is shown within the embeddable browser (e.g., if the code successfully discounted a purchase at a merchant's webpage displayed within a WebView).

Example Computing Device

Figure 7:
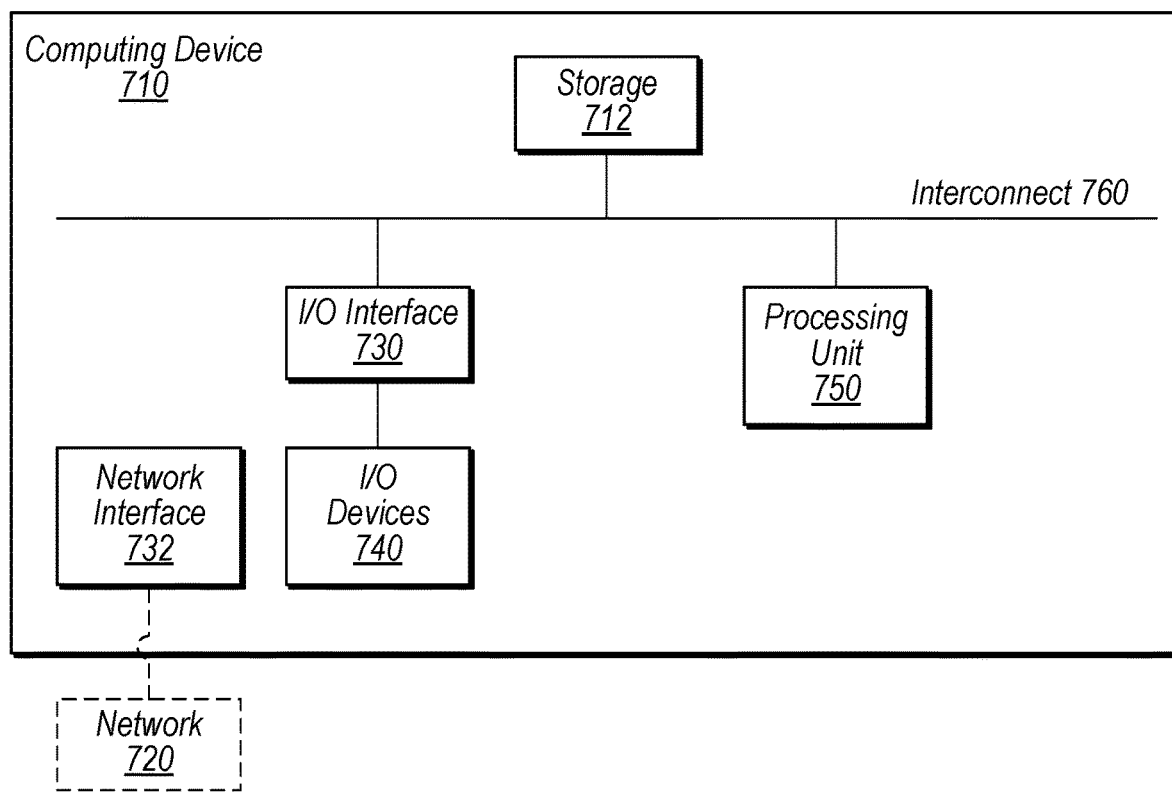
FIG. 7 is a block diagram illustrating an example computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for monitoring network traffic of a pop-up window displayed by an application executing on a mobile computing device, the method comprising:
   detecting, by the application, one or more network requests executed by the pop-up window in response to automatic manipulation of one or more user interface elements displayed in the pop-up window at the mobile computing device; and
   displaying, by the application in real-time, information corresponding to results of the detected one or more network requests, wherein the real-time display includes displaying, in response to receiving a result of a first network request, information corresponding to the result of the first network request prior to receiving a result of a second network request.

2. The method of claim 1, further comprising, prior to the automatic manipulation:
   identifying, by the application, particular content displayed within the pop-up window, wherein the automatic manipulation is performed based on the identified particular content.

3. The method of claim 1, wherein the detecting is performed by a first layer of the application using a JavaScript application programming interface (API), wherein the one or more network requests are sent in response to the first layer of the application automatically applying one or more electronic codes, and wherein the detecting further includes monitoring responses to the one or more network requests received by the pop-up window.

4. The method of claim 3, wherein the first layer of the application is a client JavaScript file injected into the pop-up window, and wherein a second layer of the application is a native application layer that is executable to display the results of observing the one or more network requests.

5. The method of claim 4, further comprising:
   inputting, based on the results of the detected one or more network requests indicating a best performing electronic code from a set of electronic codes input during the automatic manipulation, the best performing electronic code into one of the one or more user interface elements, wherein the inputting causes the code to be a final code applied to an electronic transaction initiated at the mobile computing device.

6. The method of claim 1, wherein the application further displays the pop-up window overlayed with the results displayed by the application in real-time via a user interface of the mobile computing device, and wherein the displaying includes displaying a link element that is selectable to terminate manipulation of the one or more user interface elements prior to the manipulating being complete.

7. The method of claim 1, wherein the manipulating includes:
   automatically injecting a set of electronic codes into the one or more user interface elements, wherein the one or more user interface elements are input elements programmed to receive user input, and wherein the set of electronic codes is selected for injection based on determining an entity associated with the one or more user interface elements displayed within the pop-up window of the mobile computing device.

8. The method of claim 1, wherein the automatic manipulation of the one or more user interface elements displayed in the pop-up window includes automatically inputting information into a shipping field of a form displayed via the pop-up window.

9. The method of claim 1, wherein the manipulating further includes applying, for a transaction that is not yet initiated, a set of codes in the pop-up window, and wherein the method further comprises:
causing, by the application via the pop-up window based on monitoring the one or more network requests, display of check marks at right portions of codes that were successful and x-marks at right portions of codes that were unsuccessful.

10. A non-transitory computer-readable medium having instructions stored thereon that are executable by an application executing on a mobile computing device to perform operations comprising:
detecting network traffic of a first browser displayed via the application in response to the application manipulating one or more user interface elements displayed in the first browser; and
displaying, in real-time, information corresponding to results of the detected network traffic, wherein the real-time display includes displaying, in response to receiving a result of a first network request, information corresponding to the result of the first network request prior to receiving a result of a second network request.

11. The non-transitory computer-readable medium of claim 10, wherein the operations further comprise, prior to the manipulating:
querying, by a first layer of the application, a document object model (DOM) of the first browser to identify particular content displayed within the first browser; and
receiving, by the first layer from a second layer of the application, instructions for manipulating the first browser, wherein the instructions are received based on the identified particular content.

12. The non-transitory computer-readable medium of claim 10, wherein the first browser is embedded within a second browser displayed by the application at the mobile computing device, wherein the first browser displays content from an external source, and wherein the second browser displays content from an internal source of the application.

13. The non-transitory computer-readable medium of claim 10, wherein the manipulating includes injecting a set of codes, and wherein injecting includes: altering a document object model (DOM) of the first browser, wherein the set of codes is selected for injection based on determining an entity associated with the one or more user interface elements displayed within the first browser.

14. The non-transitory computer-readable medium of claim 10, wherein the detecting performed by the application executing on the mobile computing device observes activity of the application previously restricted based on one or more security limitations of an operating system of the mobile computing device.

15. The non-transitory computer-readable medium of claim 10, wherein the displaying the results includes displaying a code drawer user interface overlayed on a transaction summary user interface displayed within the first browser, and wherein the first browser displays a website of an entity participating in an electronic transaction facilitated via the application executing on the mobile computing device.

16. A method for monitoring network traffic of an embeddable browser displayed by an application executing on a mobile computing device, the method comprising:
detecting, by the application, requests executed by the embeddable browser in response to the application manipulating one or more user interface elements displayed in the embeddable browser at the mobile computing device;
determining, by the application based on detecting requests executed by the embeddable browser in response to the manipulating, results of the detected requests; and
displaying, by the application in real-time, information corresponding to the results of the detected requests, wherein the real-time display includes displaying, in response to receiving a result of a first network request, information corresponding to the result of the first network request prior to receiving a result of a second network request.

17. The method of claim 16, further comprising, prior to the manipulating:
identifying, by the application, display of particular content within the embeddable browser, wherein the manipulating is performed based on the identified particular content.

18. The method of claim 16, wherein the detecting is performed by a first layer using a JavaScript application programming interface (API), wherein the detecting further includes monitoring responses to the requests received by the embeddable browser, and wherein a second layer of the application is a native layer of the application that receives the results of the requests from the first layer of the application.

19. The method of claim 16, wherein the requests are one or more network requests made by one or more application programming interfaces (APIs) executed by the embeddable browser within the application executing on the mobile computing device, and wherein the method further comprises:
in response to detecting one or more network requests being unsuccessful, monitoring, by a first layer of the application, information displayed within the embeddable browser, wherein the monitoring includes:
scraping, a threshold amount of time after the manipulating, a document object model (DOM) of the embeddable browser to determine information displayed within the embeddable browser, wherein the information displayed within the embeddable browser indicates results of the manipulating.

20. The method of claim 16, wherein the manipulating includes:
injecting, by altering a document object model (DOM) of the embeddable browser, a set of codes into the one or more user interface elements, wherein the set of codes is selected for injection based on determining an entity associated with the one or more user interface elements displayed within the embeddable browser.

* * * * *